Aug. 6, 1963     G. KILIAN ET AL     3,100,148
APPARATUS FOR PRODUCING DOUBLE SHEET GLAZING UNITS
Original Filed July 27, 1956     4 Sheets-Sheet 1
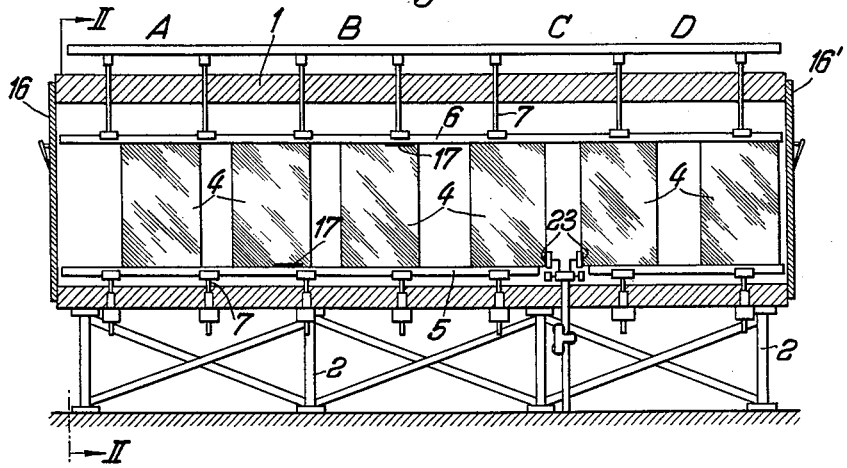
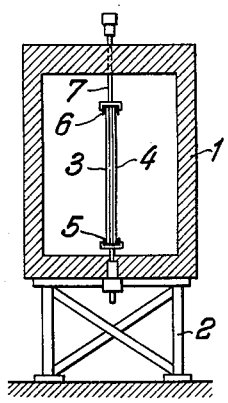
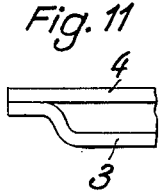
Inventor:
Georg Kilian
and Franz Main
By Nobbe & Swope
ATTORNEYS Aug. 6, 1963     G. KILIAN ET AL     3,100,148
APPARATUS FOR PRODUCING DOUBLE SHEET GLAZING UNITS
Original Filed July 27, 1956     4 Sheets-Sheet 2
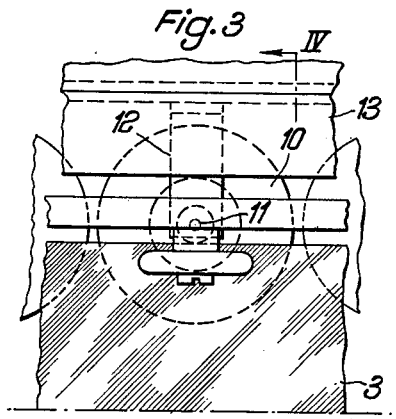
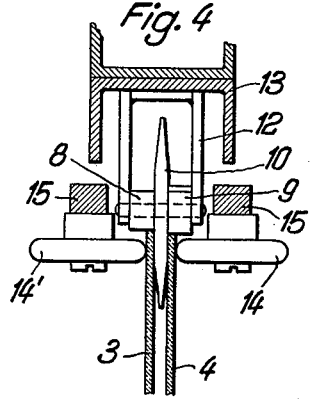
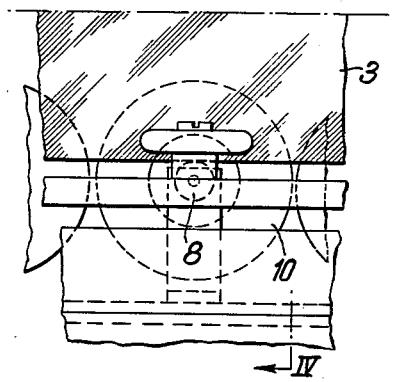
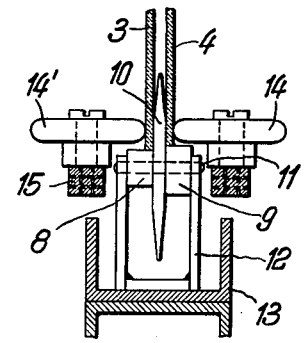
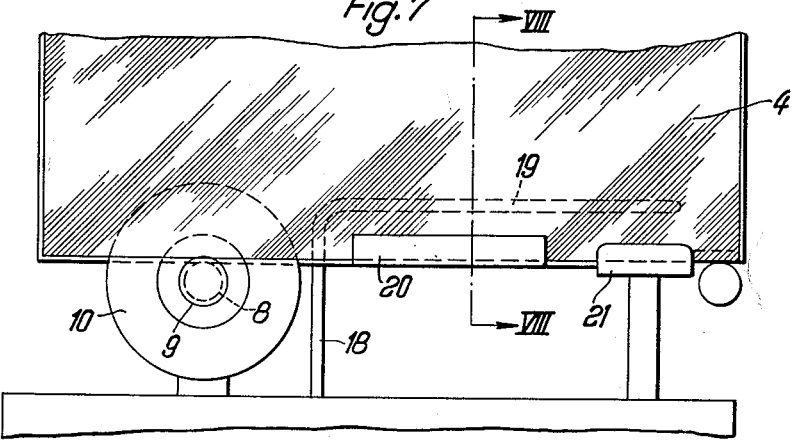
Inventor:
Georg Kilian and
Franz Marx
By Nobbe & Swope
ATTORNEYS

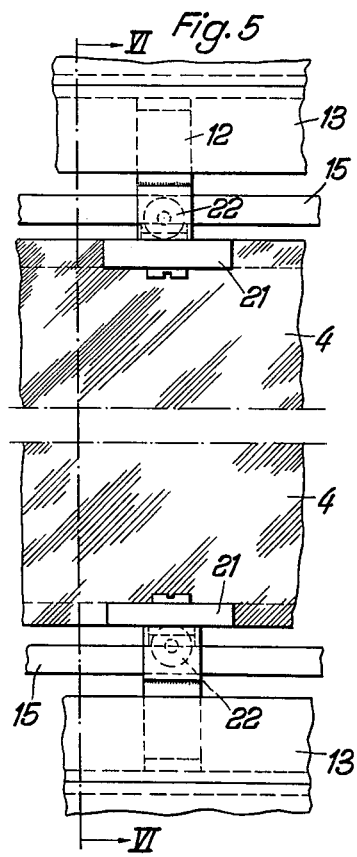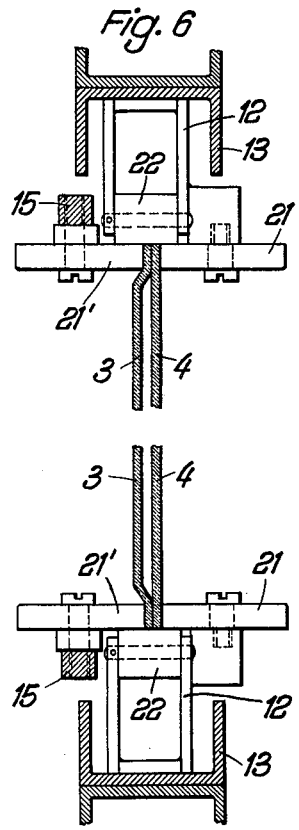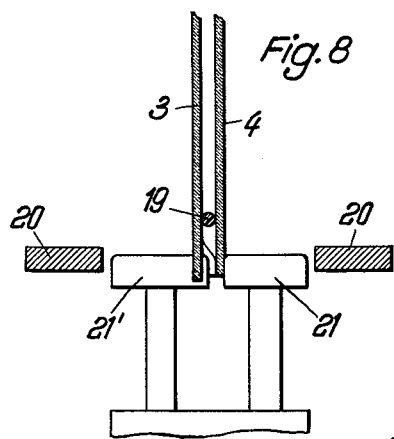

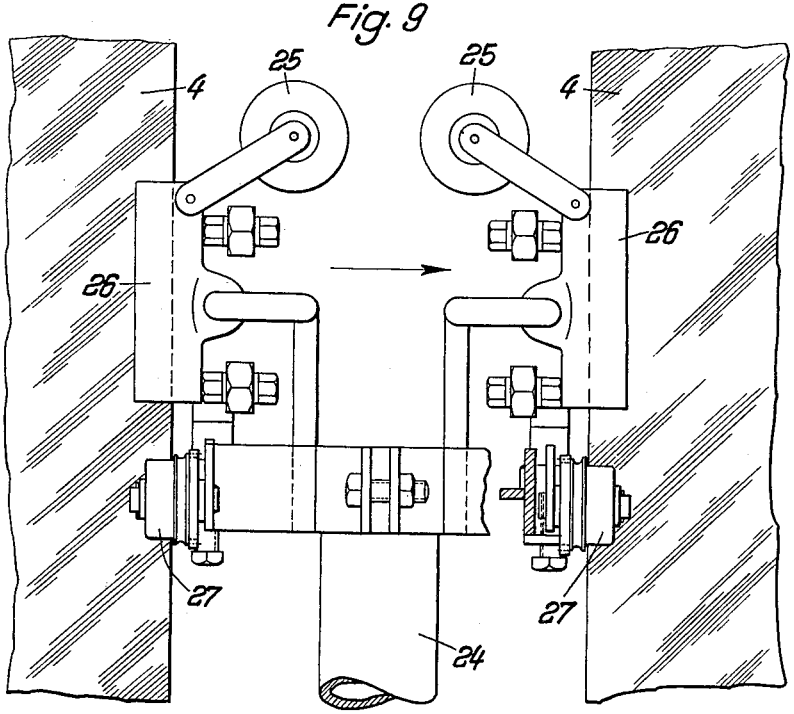
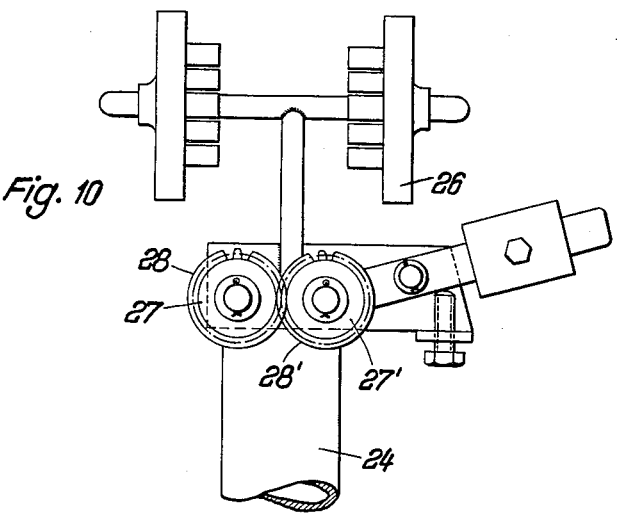

3,100,148
APPARATUS FOR PRODUCING DOUBLE SHEET GLAZING UNITS

Georg Kilian and Franz Mainz, Witten (Ruhr), Germany, assignors to Libbey-Owens-Ford Glass Company, Toledo, Ohio, a corporation of Ohio
Original application July 27, 1956, Ser. No. 600,533, now Patent No. 2,968,895, dated Jan. 24, 1961. Divided and this application Dec. 15, 1959, Ser. No. 16,622
7 Claims. (Cl. 65—152)

The invention relates to double sheet glazing units, and more particularly to improved apparatus utilized in manufacturing these units.

This application is a division of co-pending application Ser. No. 600,533, filed July 27, 1956, now Patent No. 2,968,895.

In known methods two spaced apart glass sheets are joined at their edges by a welding operation advancing along the edges, the spacing of the two sheets being effected by spacer means, which are moved from between the sheets as the welding process advances along the edges of the sheets. Known methods of this kind assure an even spacing of the glass sheets, but have the disadvantage that for properly welding the sheet edges either a glass or metal strip has to be welded between the sheet edges or the welding temperature has to be extremely accurately adjusted, if deformations of the glazing unit are to be avoided and a tight seal is to be assured. In addition to this the glazing units manufactured in accordance with these known methods do not comprise a circumferential protruding edge portion, which is most desirable because glazing units having circumferential protruding edge portions may much easier be mounted into window frames or the like.

In accordance with the invention the sheet edges, after being heated up to softening temperature, are pressed or worked together by two presser rolls, engaging the outer surfaces of the edge portions. Thus the manufacture of double glazed units is greatly simplified. A close bond between the sheets is assured due to the pressing of the protruding edge portions by the presser rolls. The protruding edge portion formed by the two presser rolls may be positioned in the middle of the rim of the glazing unit. Preferably, however, one of the presser rolls is arranged so as to contact one of the sheets substantially in the face plane of said sheet, whereas the other one of the two presser rolls is mounted offset from the face of the other sheet a distance sufficient for crimping or beading over the well heated edge of the last mentioned sheet towards the first mentioned sheet to such an extent that both edges can be pressed together by the two presser rolls. The new method makes it possible to keep the temperature of the edge portion of that sheet, which substantially retains its plane surface relatively low and to thereby avoid undesirable twisting and warping of the double glazed unit.

According to a preferred embodiment of the invention the sheets to be united are, during the process, moved in upright position on a guiding track through a furnace and are urged by guide rolls or the like towards spacer means arranged between the sheets. A very simple and reliable guidance of the sheets is thus obtained and deformations of the sheets are avoided.

The upper and lower edges of the vertically disposed sheets are preferably guided by rollers when moving through the furnace. The edges are joined together at welding stations interposed between adjacent rollers of each of the guiding tracks. After the welding of the upper and lower edges the sheets reach an operational station at which their two vertical edges which are still open are welded together with the aid of compulsory guided vertically movable welding means. These welding means preferably comprise a swingable mounted spacer roll which can be swung into and out of a position in which it protrudes between the vertical edges, a burner unit and a set of presser rolls for pressing the edges together.

By inserting small capillary tubular members or the like between the edges to be welded together it is possible to provide apertures through which during the tempering period the equalization of pressure takes place and through which a dry gas e.g. dry air may be fed into the annealed glazing unit. Then the openings will be closed or sealed to be air- and water-tight by a special procedure not described.

Apart from the above mentioned method of manufacture of double glazing units and the above referred to apparatus for manufacturing double glazing units it is a further object of the invention to provide a double glazing unit in which the edge portion of one of the two sheets is offset towards the other sheet and the edge portion of the other sheet is not offset, the offsetting of the first mentioned edge portion having been effected by presser rolls beading over the edge portion of a sheet larger than the other sheet until said edge portion has come into contact with the edge portion of the other sheet.

An embodiment of the invention will now be described by way of example in connection with the accompanying drawings.

In the drawings:

FIGURE 1 shows a longitudinal sectional view of a tunnel furnace for the manufacture of double glazing units. The drawing is schematic and many details of construction are omitted for the sake of clarity.

FIGURE 2 is a cross sectional view taken along line II—II of FIG. 1.

FIGURE 3 is an elevational view showing part of the guiding means on which the glass sheets are moved through the furnace.

FIGURE 4 is a sectional view taken along line IV—IV of FIG. 3.

FIGURE 5 is an elevational view showing another part of the guiding means on which the double glazing units are supported after welding of their horizontal edge portions.

FIGURE 6 is a sectional view taken along line VI—VI of FIG. 5.

FIGURE 7 is an elevational view of a glass sheet at the welding station showing a modified arrangement of the presser rolls.

FIGURE 8 is a sectional view taken along line VIII—VIII of FIG. 7.

FIGURE 9 shows the apparatus for welding the vertical edges of the double glazing unit in an elevational view.

FIGURE 10 is an elevational view of a modified form of the apparatus shown in FIG. 9, viewed in the direction of the arrow shown in FIG. 9 but without the spacer rolls.

FIGURE 11 is a cross sectional view of a portion of a double glazing unit according to the invention.

In the diagrammatic view of FIGS. 1 and 2 of a tunnel furnace four operational stations or zones are provided inside the furnace: a preheating zone A, a welding zone B, in which the upper and lower edges of a pair of glass sheets are united, a second welding zone C, in which the two lateral edges of the sheets are united, and a cooling zone D. The furnace which is designated by the reference numeral 1 is supported by a frame 2. The spaced apart glass sheets 3, 4 are fed into the furnace in an upright or vertical position. The mechanism for moving the glass sheets into and through the furnace is not shown and forms no part of the present invention. A suitable pusher type mechanism may be used for this purpose. When passing through the tunnel furnace 1 the sheets travel between lower and upper guiding means 5, 6. The guiding means 5 and 6 are preferably so arranged as to be movable towards or away from one another in order to accommodate sheets of different height between them. Adjustment of the guiding means can for instance be effected by changing the position of the guiding means 5, 6 on the supporting arms 7. The travelling sheets can either be supported by suspension from the upper guiding means, or as it is shown in the modifications described below, be supported on the lower guiding means. In the embodiment of the invention shown as example in FIGURES 1 and 2 the double sheet glazing units are made from two sheets of equal dimensions, the edge portion of the finished glazing unit being positioned in the middle of the rim of the glazing unit.

In FIGS. 3 to 6 the two sheets 3, 4 of different size to be united travel on a roller guide way comprising a plurality of sets of supporting rolls 8, 9. Corresponding rolls 8, 9 can, as shown in the drawing be used in the upper guiding means for guiding the upper edges of the sheets. Spacer rolls 10 protruding into the space between two juxtaposed sheets are also provided. The lateral surfaces of the disk like rolls 10 converge from the center toward the circumference so that these lateral surfaces only come in contact with the edge portions of the sheets later to be united.

Two supporting rolls 8, 9 and a spacer roll 10 disposed between these two supporting rolls form a set of rolls arranged on a single shaft 11 which is fastened by means of supporting members 12 to a beam 13 horizontally extending through the tunnel furnace. The glass sheets 3, 4 are held in their upright position by means of guide rolls 14, 14' in contact with the edge portions of the outer surfaces of the sheets. The guide rolls are rotatably fastened to horizontal supporting beams 15 extending parallel to the beams 13. Preferably a pair of opposed guiding rolls 14, 14' is arranged adjacent to the supporting and spacer rolls 8, 9, 10.

After entering the furnace the temperature on the outer surfaces and on the inner surfaces of the sheet will rise at a different rate, so that heat motion will occur in the sheets until the temperatures on both sides of the sheets are equally high. To avoid breaking of the sheets due to undesired deformations it has been found of advantage to swingably support guide rolls disposed near the furnace entrance and do this preferably in such a way that these rolls when swung out by the heat motion are biased to return to their normal position.

At the beginning of the operation the door 16 of the tunnel furnace is opened. A pair of sheets is then placed on the roller guide way and pushed into the preheating zone. As soon as the sheets have, after the door has been closed, reached the desired working temperature, they are pushed along the roller guide way into the welding zone B. During their travel through this zone the upper and lower edges of the sheets are moved successively or simultaneously past the welding stations 17, where these edges are welded together.

After leaving the last ones of the series of supporting and spacer roller sets the sheets move towards a spacer rod 18 (FIGS. 7 and 8) provided with a hook shaped extension 19 extending horizontally through the burner zone. This spacer rod is disposed in line with the spacer rolls so that it enters the space between the sheets when the sheets are moving past it. These rods serve to keep the sheets from being pushed into contact with one another when the lower resp. upper edge zones of the sheets are heated by the flames of the burners 20 up to such a temperature that they may subsequently be pressed together by the driven presser rolls 21, 21' (see FIGS. 5 to 8). The presser rolls are disposed opposite one another on the upper and lower edge portions of the outer surfaces of the sheets. One of the presser rolls is arranged in an offset position relative to the corresponding guide roll 14 or 14'. This offset arrangement of one of the guide rolls make it possible to obtain double glazed units in which one outer side of the welded edge portion is aligned with the outer surface of one of the sheets (see FIG. 6). Thereby the burners should be adjusted in such a manner that the edge of the sheet of the finished glazing unit which substantially retains its plane surface, will be less heated than the edge of the other sheet which is to be beaded towards the first mentioned sheet.

The guide rolls as well as details of the pressed roll drive and details of the burners are not shown in the schematic views of FIGS. 7 and 8. Conventional burners and drive mechanisms may be used.

After passing the burners 20 and the presser rollers 21, 21' the sheets now welded together at their upper and lower edges are moved into the operational zone C. During such movement the sheets are supported on rollers 22. In the zone C the lateral edges of the sheets are welded by welding devices or means 23 which can be moved vertically along the vertical edges of the sheets.

The vertically moving welding means is mounted on carrier means 24 (FIGS. 9 and 10) which extend through the wall of the furnace 1. Preferably tubular carrier means 24 are used which can be raised and lowered by suitable mechanism. The welding means preferably comprise a spacer device usually a roll 25 (FIG. 9) which is swingably mounted, so that it can be swung into and out of the space between the lateral edges of the two sheets. Burners 26 are mounted below the spacer means. The gas supply pipe for the burners can for instance go through the hollow carrier means. Below the burner two presser rolls 27, 27' are arranged, one of which (27') is mounted adjustably so that it can be moved towards and away from the other presser roll, if the thickness of the glass sheets varies. The shafts of the rolls 27, 27' are provided with meshing spur pinions 28, 28' so that only one of the pinions has to be connected with a driving mechanism. Various driving mechanisms of known type may be used. For instance the drive may be effected by means of a wire or a thin belt of tubular cross section or by means of a flexible shaft or by shaft and gear drive through the tubular carrier means.

In the modification shown, two welding means are mounted on said carrier means. One of the welding units is facing towards the entrance of the furnace and the other one towards the outlet end of the furnace (see FIG. 1). This arrangement makes it possible to simultaneously weld the forward facing edge of one glazing unit and the rearward facing edge of a glazing unit of which the forward edge has already been welded in a previous working step.

We claim:

1. Apparatus for manufacturing double sheet glazing units comprising a furnace, upper and lower guide means disposed within said furnace and operable to support two glass sheets in parallelly spaced face-to-face relationship in an upright position for movement through said furnace, first burner means disposed adjacent said guide means to heat the upper and lower edges of the glass sheets, first driven rolling presser means disposed adjacent said first burner means, a second burner means, a second rolling presser means disposed adjacent said second burner means, means mounting said second burner and pressing means for vertical movement between said upper and lower guide means, said first burner and presser means serving to unite the upper and lower edges of the glass sheets, and said second burner and presser means serving to unite the vertical edges of the glass sheets.

2. Apparatus according to claim 1 wherein said first guiding means comprises two roller tracks horizontally extending through the furnace, said roller tracks being vertically spaced apart for a distance corresponding to the height of the glass sheets, the rolls forming said tracks consisting of two outer rolls serving as guides for the upper and lower edges of the two glass sheets and a spacer roll having a larger diameter than said first mentioned rolls and partially extending between said two glass sheets.

3. Apparatus according to claim 2 wherein said outer rolls have different diameters.

4. Apparatus according to claim 3 wherein said guiding means also comprises guide rolls engaging the outer surfaces of said two glass sheets to prevent lateral movement thereof.

5. Apparatus according to claim 1 wherein spacer rods are provided adjacent said upper and lower guiding means, said spacer rods having hookshaped horizontal extensions extending parallel to said first burner means and being located so as to enter the space between the two glass sheets when said sheets are moved past the first burner and first presser means.

6. Apparatus for manufacturing double sheet glazing units as defined in claim 1, wherein said second burner and presser mounting means comprise a vertically movable carrier extending through a wall of said furnace.

7. Apparatus for manufacturing double sheet glazing units as defined in claim 6, a swingably mounted spacer means mounted on said carrier means adjacent said burner means.

References Cited in the file of this patent

UNITED STATES PATENTS

| | | |
|---|---|---|
| 1,984,942 | Owen | Dec. 18, 1934 |
| 2,116,297 | Aurien | May 3, 1938 |
| 2,172,899 | Barnard | Sept. 12, 1939 |
| 2,761,248 | Cowley et al. | Sept. 4, 1956 |
| 2,788,105 | Clayton | Apr. 9, 1957 |
| 2,964,878 | Montgomery et al. | Dec. 20, 1960 |
| 2,999,337 | Sharp | Sept. 12, 1961 |